United States Patent
Chen et al.

(10) Patent No.: US 10,248,140 B2
(45) Date of Patent: Apr. 2, 2019

(54) PRESSURE REGULATOR AND HIGH PRESSURE SOURCE ASSEMBLY WITH THE SAME

(71) Applicant: BANZA STAMPING INDUSTRY CORP., Su?ao Township (TW)

(72) Inventors: Li-Wei Chen, Su'ao Township (TW); Cole Krebs, Su'ao Township (TW)

(73) Assignee: BANZA STAMPING INDUSTRY CORP., Su'ao Township, Yilan County (TW)

( * ) Notice: Subject to any disclaimer, the term of this patent is extended or adjusted under 35 U.S.C. 154(b) by 0 days.

(21) Appl. No.: 15/613,495

(22) Filed: Jun. 5, 2017

(65) Prior Publication Data
US 2018/0348800 A1 Dec. 6, 2018

(51) Int. Cl.
*G05D 16/16* (2006.01)

(52) U.S. Cl.
CPC ........ *G05D 16/166* (2013.01); *Y10T 137/781* (2015.04)

(58) Field of Classification Search
CPC ............... G05D 16/103; G05D 16/166; Y10T 137/7808; Y10T 137/781; Y10T 137/7811; Y10T 137/7822
See application file for complete search history.

(56) References Cited

U.S. PATENT DOCUMENTS

| | | | | |
|---|---|---|---|---|
| 4,158,367 A | * | 6/1979 | Mailliet ................ | C21B 7/005 137/340 |
| 4,181,139 A | * | 1/1980 | Martini ................. | G05D 16/10 137/505.25 |
| 4,192,298 A | * | 3/1980 | Ferraro ............... | B63C 11/2236 128/205.24 |
| 6,056,006 A | * | 5/2000 | Hagerty ............... | G05D 16/103 137/269 |
| 6,321,779 B1 | * | 11/2001 | Miller ................. | G05D 16/103 137/340 |
| 7,059,343 B2 | | 6/2006 | Carroll | |
| 2003/0075219 A1 | * | 4/2003 | Carroll ................. | G05D 16/103 137/505.25 |
| 2005/0103383 A1 | * | 5/2005 | Carroll ................. | G06Q 10/10 137/505.28 |
| 2014/0312042 A1 | * | 10/2014 | Larsen ................. | B67D 1/008 220/583 |
| 2017/0212534 A1 | * | 7/2017 | Graham ............... | G05D 16/106 |

* cited by examiner

Primary Examiner — Jessica Cahill
(74) Attorney, Agent, or Firm — patenttm.us (57) ABSTRACT

A pressure regulator has a main body, a piston, an elastic element and an adjusting element. The main body has an inlet and an outlet. The piston is mounted movably between the inlet and the outlet. The elastic element is mounted in the main body to prepossess that the piston to move toward the outlet of the main body. The adjusting element is mounted adjustably in the main body and selectively abuts against the piston to selectively close a flow path from the inlet to the outlet. Adjusting the position of the adjusting element results influences the compressed length of the elastic element. Therefore, the preset outlet pressure is fine-tuned.

20 Claims, 8 Drawing Sheets

PRESSURE REGULATOR AND HIGH PRESSURE SOURCE ASSEMBLY WITH THE SAME

BACKGROUND OF THE INVENTION

1. Field of the Invention

The present invention relates to a pressure regulator, specifically a pressure regulator that may be fine-tuned.

2. Description of the Prior Arts

Pressure regulators are used to reduce the input pneumatic pressure to a desired output pneumatic pressure and are used widely in various devices. A conventional pressure regulator as shown in U.S. Pat. No. 7,059,343, which is incorporated by reference herein in its entirety, includes a piston mounted movably between the inlet and the outlet to selectively stop the gas flow from a high pressure gas source to a downstream device such as paint ball gun or the like. A spring is mounted around the piston to urge the piston to move toward the outlet. When the outlet side pressure is set at the preset pressure, the elastic force of the spring is offset by the outlet side pressure so that the piston is urged to seal the inlet to stop the gas from flowing through the conventional pressure regulator. When the outlet side pressure begins to decrease, the outlet side pressure is not strong enough to offset the elastic force of the spring so that the piston is urged to move away from the inlet to allow the gas to flow through the conventional pressure regulator.

The conventional pressure regulator utilizes different springs or different amount of elastic washers to preset the desired outlet side pressure. The springs and the elastic washers have tolerance so that the preset outlet side pressure is different with the desired outlet side pressure. To reduce the difference, the manufacturer has to change the spring or the amount of the elastic washers. However, changing the spring or the amount of the elastic washers cursorily adjusts the outlet side pressure, especially for the high pressure gas source. Therefore, the conventional pressure regulator still has a difference of over 100 psi between the preset outlet side pressure and the desired outlet side pressure.

To overcome the shortcomings, the present invention provides a pressure regulator to mitigate or to obviate the aforementioned problems.

SUMMARY OF THE INVENTION

The main objective of the present invention is to provide pressure regulator that can be fine-tuned to eliminate the pressure difference by the tolerance of the elastic element. The pressure regulator has a main body, a piston, an elastic element and an adjusting element. The main body has an inlet and an outlet. The piston is mounted movably between the inlet and the outlet. The elastic element is mounted in the main body to prepossess the piston to move toward the outlet of the main body. The adjusting element is mounted adjustably in the main body and selectively abuts against the piston to selectively close a flow path from the inlet to the outlet. Adjusting the position of the adjusting element results influences the compressed length of the elastic element. Therefore, the preset outlet pressure is fine-tuned.

Other objectives, advantages and novel features of the invention will become more apparent from the following detailed description when taken in conjunction with the accompanying drawings.

DETAILED DESCRIPTION OF THE EMBODIMENTS

Figure 1:
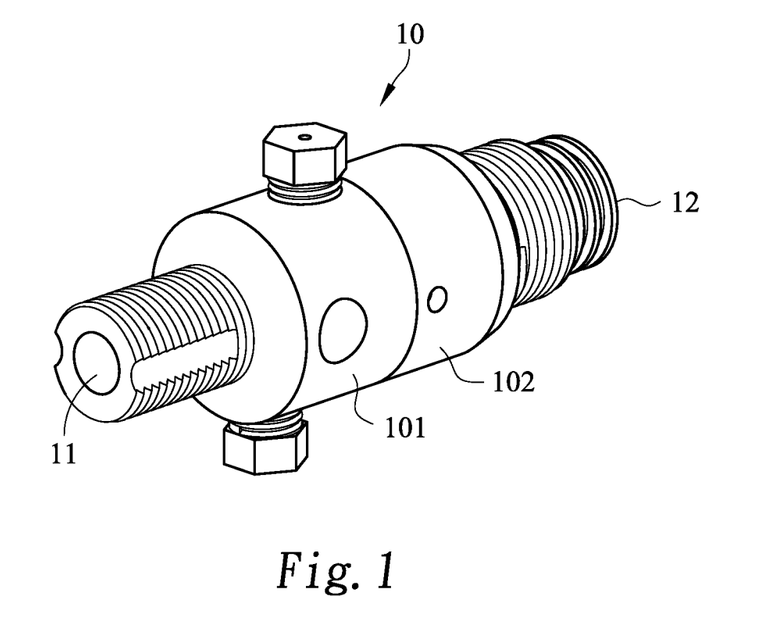
FIG. 1 is a perspective view of a pressure regulator in accordance with the present invention.
Figure 2:
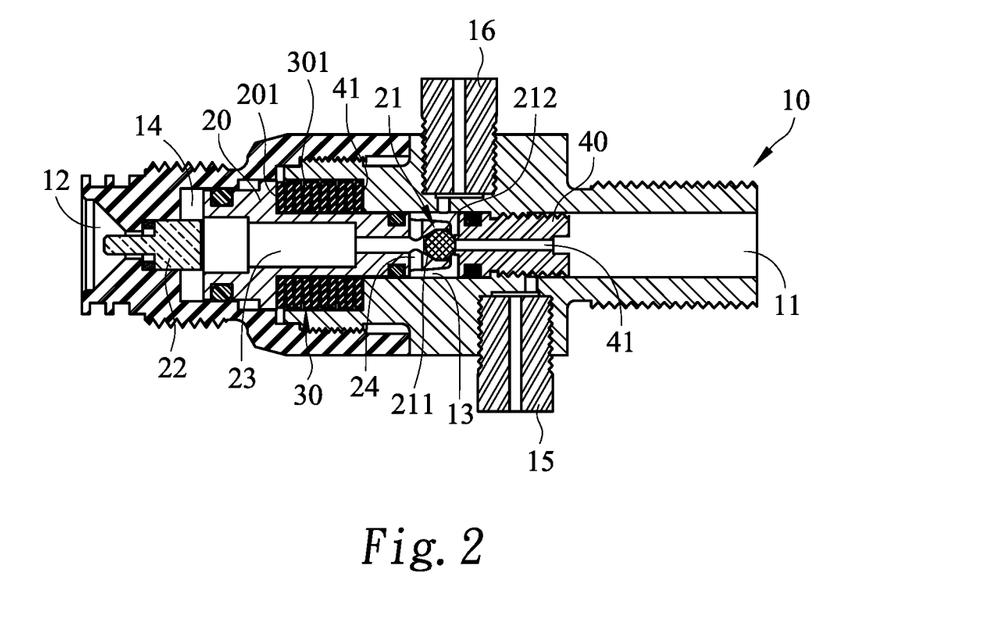
FIG. 2 is an operational side view in partial section of the pressure regulator in FIG. 1, showing the closed state.

With reference to FIGS. 1 and 2, a pressure regulator in accordance with the present invention comprises a main body 10, a piston 20, an elastic element 30 and an adjusting element 40.

The main body 10 is hollow and has an inlet 11, an outlet 12, a high pressure chamber 13 and a regulated chamber 14. The high pressure chamber 13 is defined between the inlet 11 and the outlet 12 and communicates with the inlet 11. The regulated chamber 14 is defined between the inlet 11 and the outlet 12 and communicates with the outlet 12 and the high pressure chamber 13. In one embodiment, the main body 10 may comprise a seat 101 and a bonnet 102 screwed on the seat 101. The main body 10 may comprise a high pressure over pressurization device 15 and a regulated pressure over pressurization device 16 exemplary high pressure and regulated pressure burst disks.

The piston 20 is mounted moveably in the high pressure chamber 13 and the regulated chamber 14 and has a first end toward the inlet 11 and a second end toward the outlet 12. A sealing segment 21 is attached to the first end of the piston 20 and may comprise a socket 211 formed on the first end of the piston and a sealing ball 212 mounted in the socket 211. The sealing ball 212 may be alter by disk, cone, washer, plate, ring bumper and so on. In one embodiment, a pin valve 22 is mounted in the central hole 23 of the piston 20, extends through the second end of the piston 20 and provides a sealable flow path from the main body to the down stream device. The pin valve 22 is kept within the piston 20 by a spring (not shown) to help keep the pin valve 22 closed. The pin valve 22 permits removing or separating the main body 10 from the downstream device without loss of gas pressure. At least one opening 24 is formed through a sidewall of the piston 20 and communicates with the central hole 23.

Figure 3:
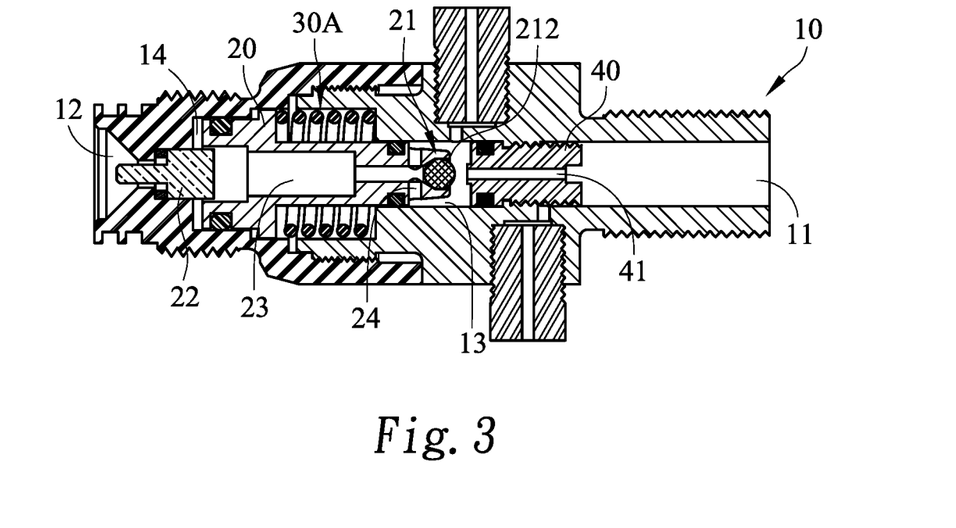
FIG. 3 is a side view in partial section of a pressure regulator in accordance with the present invention.

The elastic element 30 is mounted in the regulated chamber 14 of the main body 10 to prepossess the piston 20 to move toward the outlet 12 of the main body 10. In one embodiment, a shoulder 141 is formed in the regulated chamber 14 and a flange 201 is formed around the piston 20. The elastic element 30 is clamped between the shoulder 141 and the flange 201 to prepossess the piston 20 to move toward the outlet 12 of the main body 10. In one embodiment, the elastic element 30 may comprise multiple elastic washers as shown in FIG. 2. In another embodiment, the elastic element 30A may be a spring as shown in FIG. 3.

Figure 4:
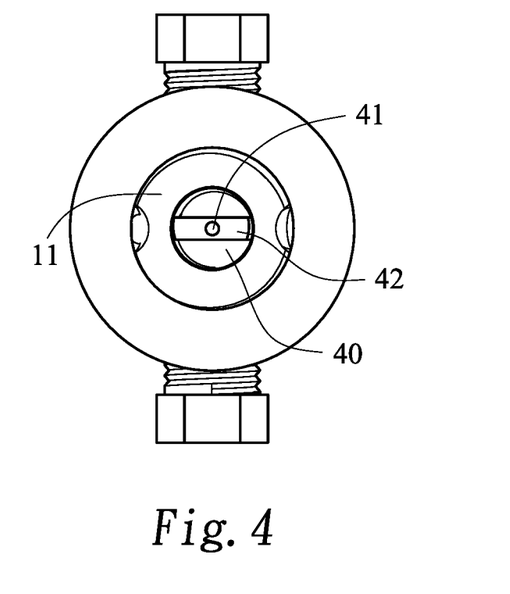
FIG. 4 is an end view of the pressure regulator in FIG. 1.

The adjusting element 40 is mounted adjustably in and selectively held in the high pressure chamber 13 of the main body 10, and selectively abuts against the sealing segment 21 to selectively close a flow path from the inlet 11 to the outlet 12 of the main body 10. In one embodiment, the adjusting element 40 has a central opening 41 selectively blocked by the sealing segment 21 to selectively close a flow path from the inlet 11 to the outlet 12 of the main body 10. In one embodiment, the adjusting element 40 is screwed in the high pressure chamber 13 of the main body 10 so that the adjusting element 40 is mounted adjustably in and selectively held in the high pressure chamber 13 of the main body 10. With reference to FIG. 4, in one embodiment, the adjusting element 40 may have a driving recess formed on an end thereof so it will be easier for the user to use a hand tool to adjust the position of the adjusting element 40.

Figure 5:
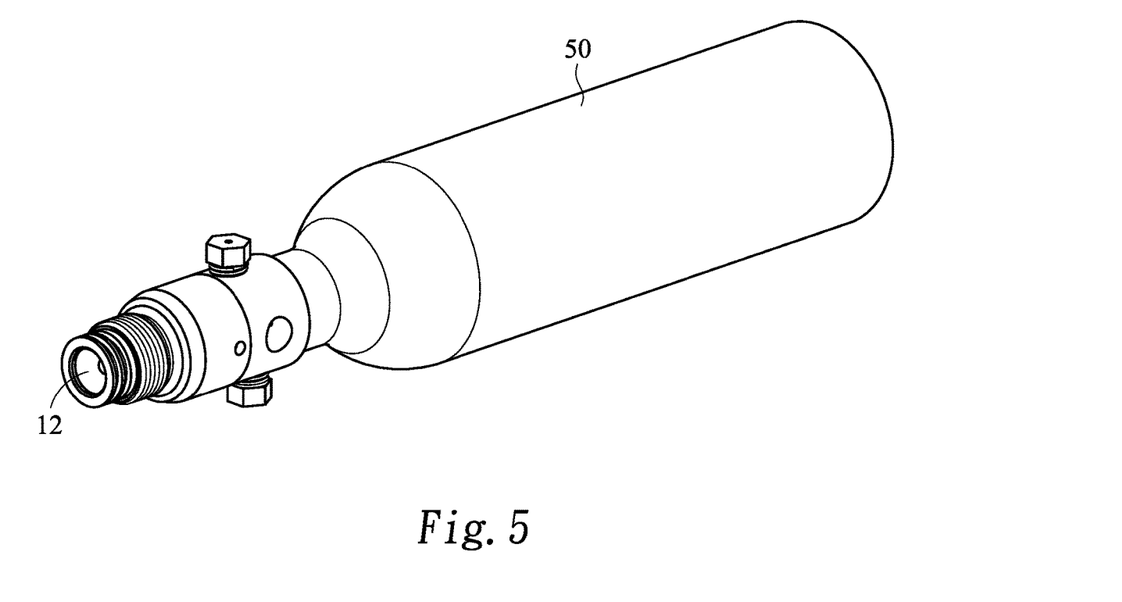
FIG. 5 is a perspective view of a high pressure source assembly in accordance with the present invention having the pressure regulator in FIG. 1.

With reference to FIGS. 2 and 5, in operation, a high pressure source assembly in accordance with the present invention has a high pressure gas source 50 and the pressure regulator as described. The pressure regulator as described is connected between the high pressure gas source 50 and a downstream device (not shown). The inlet 11 of the main body 10 is connected to the high pressure gas source 50. The outlet 12 of the main body 10 is connected to the downstream device. FIG. 2 shows the pressure regulator as described in a closed state. When the gas pressure in the downstream device is at the preset pressure, the gas pressure on the outlet 12 is sufficiently high to offset the force of the elastic element 30. Then the sealing segment 21 of the piston 20 abuts against the adjusting element 40 to stop the gas flow from the inlet 11 to the outlet 12. Therefore, the gas in the high pressure gas source is stopped from flowing into the downstream device in the closed state.

Figure 6:
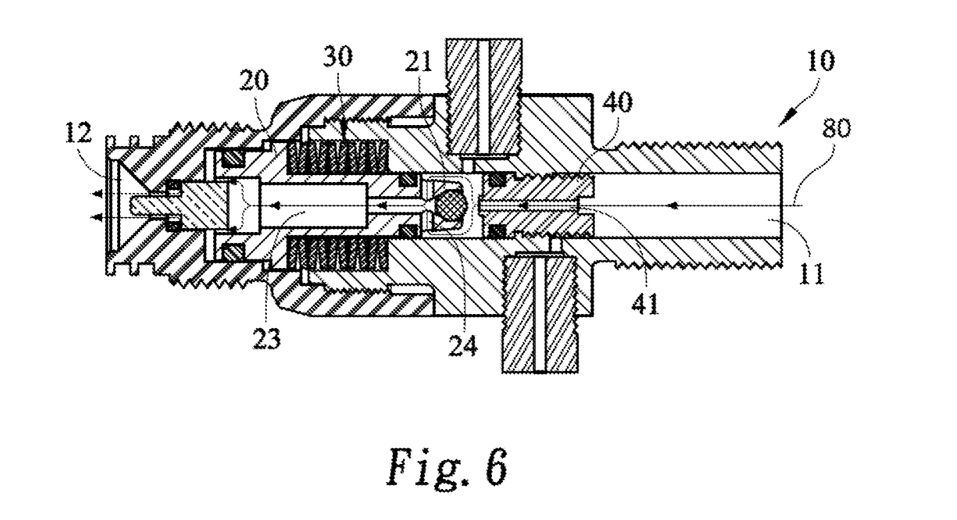
FIG. 6 is an operational side view in partial section of the pressure regulator in FIG. 1, showing the open state.

With further reference to FIG. 6, the pressure regulator as described is in an open state. The gas pressure in the downstream device decreases so that the gas pressure on the outlet 12 is not high enough to offset the force of the elastic element 30. Then the elastic element 30 pushes the piston 20 to move toward the outlet 12 so that the sealing segment 21 permits the adjusting element 40 to allow the gas to flow from the inlet 11 to the outlet 12 through the central opening 41 of the adjusting element 40 and the central hole 23 of the piston 20, which forms the flow path 80 from the inlet 11 to the outlet 12 of the main body 10. Therefore, the gas in the high pressure gas source flows into the downstream device in the open state to increase the gas pressure in the downstream device. When the gas pressure in the downstream device is sufficiently high again, the pressure regulator as described is back to the closed state.

When the pressure regulator as described is set to the desired outlet pressure, an elastic element 30 providing the desired force is chosen. Since the elastic element 30 has the tolerance to influence the preset outlet pressure, the adjusting element 40 is adjusted to eliminate pressure influence resulting from the tolerance of the elastic element 30.

When the preset outlet pressure is less than the desired outlet pressure due to the tolerance of the elastic element 30, the adjusting element 40 is adjusted toward the inlet 11 as shown in FIGS. 2 and 6. Then the piston 20 needs to move closer to the inlet 11 so that the sealing segment 21 can abut against the adjusting element 40 to selectively block the gas flow. When the piston 20 moves closer to the inlet 11, the elastic element 30 is compressed more. Based on Hooke's Law, the more the elastic element 30 is compressed, the force of the elastic element 30 is larger. Since the force of the elastic element 30 is larger, the outlet pressure has to be even larger to sufficiently offset the force of the elastic element 30. Therefore, the preset outlet pressure is increased to match the desired outlet pressure by adjusting the adjusting element 40 that is adjusted toward the inlet 11.

Figure 7:
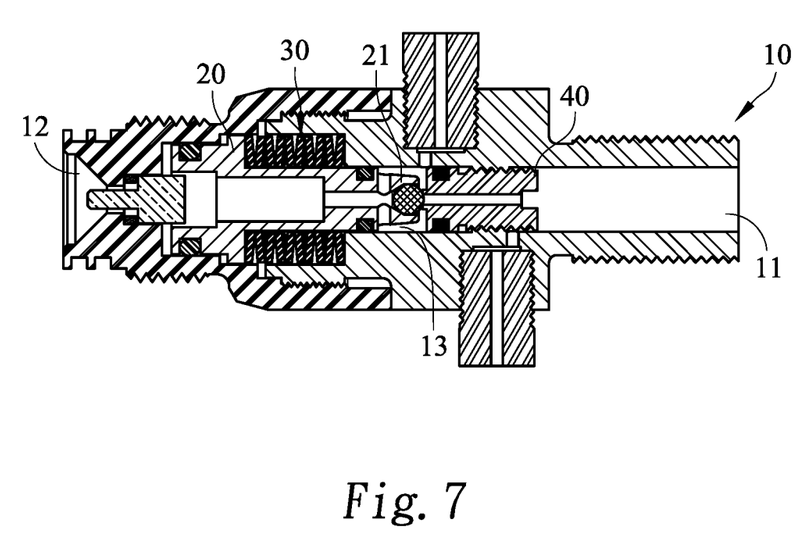
FIG. 7 is another operational side view in partial section of the pressure regulator in FIG. 1, showing the closed state.
Figure 8:
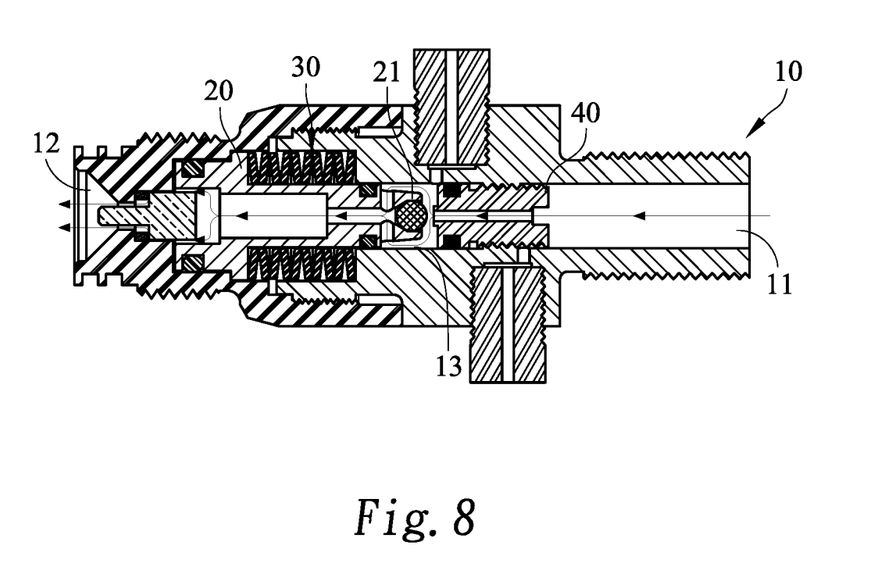
FIG. 8 is another operational side view in partial section of the pressure regulator in FIG. 1, showing the open state.

When the preset outlet pressure is more than the desired outlet pressure due to the tolerance of the elastic element 30, the adjusting element 40 is adjusted toward the outlet as shown in FIGS. 7 and 8. Then the piston 20 does not need to move much and then the sealing segment 21 can abut against the adjusting element 40 to selectively block the gas flow. Then the elastic element 30 is compressed less. Based on Hooke's Law, the less the elastic element 30 is compressed, the force of the elastic element 30 is smaller. Since the force of the elastic element 30 is smaller, the outlet pressure has to be even smaller to sufficiently offset the force of the elastic element 30. Therefore, the preset outlet pressure is decreased to match the desired outlet pressure by adjusting the adjusting element 40 that is adjusted toward the outlet 12.

With the adjusting element 40, the pressure regulator as described can fine-tune the preset outlet pressure to match the desired outlet pressure. Therefore, the pressure regulator as described has a more precise preset outlet pressure. In one embodiment, the difference is in 50 psi between the preset outlet pressure and the desired outlet pressure. In one embodiment, the difference is in 20 psi between the preset outlet pressure and the desired outlet pressure. In one embodiment, the difference is in 10 psi between the preset outlet pressure and the desired outlet pressure.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A pressure regulator comprising:
a main body adapted for being mounted on a high pressure source without intermediary and having
an inlet;
an outlet;
a high pressure chamber defined between the inlet and the outlet and communicating with the inlet; and
a regulated chamber defined between the inlet and the outlet and communicating with the outlet and the high pressure chamber;
a piston mounted moveably in the high pressure chamber and the regulated chamber and having
a first end toward the inlet of the main body;
a second end toward the outlet of the main body;
a sealing segment attached to the first end of the piston;
an elastic element mounted in the regulated chamber of the main body to prepossess the piston to move toward the outlet of the main body; and
an adjusting element comprising a single element, mounted adjustably in and selectively held in the high pressure chamber of the main body, and having a central opening formed axially through the adjusting element and communicating with the inlet to selectively allow a flow path from the inlet passing through the central opening of the adjusting element and past the sealing segment to the outlet, wherein the flow path is co-linear with a longitudinal axis of the adjusting element and extends along the entire longitudinal axis of the adjusting element, and wherein the adjusting element selectively abuts against the sealing segment and the central opening of the adjusting element is selectively blocked by the sealing segment to selectively close the flow path from the inlet to the outlet of the main body.

2. The pressure regulator as claimed in claim 1, wherein a central hole is formed in the piston; and at least one opening is formed through a sidewall of the piston and communicates with the central hole.

3. The pressure regulator as claimed in claim 2, wherein a pin valve is mounted in the central hole of the piston and extends through the second end of the piston.

4. The pressure regulator as claimed in claim 1, wherein the adjusting element is screwed in the high pressure chamber of the main body.

5. The pressure regulator as claimed in claim 4, wherein the adjusting element has a driving recess formed on an end thereof.

6. The pressure regulator as claimed in claim 1, wherein the sealing segment of the piston comprises
a socket formed on the first end of the piston; and
a sealing ball mounted in the socket.

7. The pressure regulator as claimed in claim 1, wherein the elastic element comprises multiple elastic washers.

8. The pressure regulator as claimed in claim 1, wherein the elastic element is a spring.

9. The pressure regulator as claimed in claim 1, wherein a shoulder is formed in the regulated chamber;
a flange is formed around the piston; and
the elastic element is clamped between the shoulder and the flange to prepossess the piston to move toward the outlet of the main body.

10. The pressure regulator as claimed in claim 1, wherein the main body comprise a seat and a bonnet screwed on the seat.

11. A high pressure source assembly comprising:
a high pressure source; and
a pressure regulator connecting to the high pressure source and having
  a main body mounted on the high pressure source without intermediary and having
    an inlet connecting to the high pressure source;
    an outlet;
    a high pressure chamber defined between the inlet and the outlet and communicating with the inlet; and
    a regulated chamber defined between the inlet and the outlet and communicating with the outlet and the high pressure chamber;
  a piston mounted moveably in the high pressure chamber and the regulated chamber and having
    a first end toward the inlet of the main body;
    a second end toward the outlet of the main body;
    a sealing segment attached to the first end of the piston;
  an elastic element mounted in the regulated chamber of the main body to prepossess the piston to move toward the outlet of the main body; and
  an adjusting element comprising a single element, mounted adjustably in and selectively held in the high pressure chamber of the main body, and having a central opening formed axially through the adjusting element and communicating with the inlet to selectively allow a flow path from the inlet passing through the central opening of the adjusting element and past the sealing segment to the outlet,
  wherein the flow path is co-linear with a longitudinal axis of the adjusting element and extends along the entire longitudinal axis of the adjusting element, and
  wherein the adjusting element selectively abuts against the sealing segment and the central opening of the adjusting element is selectively blocked by the sealing segment to selectively close a flow path from the inlet to the outlet of the main body.

12. The high pressure source assembly as claimed in claim 11, wherein
a central hole is formed in the piston; and
at least one opening is formed through a sidewall of the piston and communicates with the central hole.

13. The high pressure source assembly as claimed in claim 12, wherein a pin valve is mounted in the central hole of the piston and extends through the second end of the piston.

14. The high pressure source assembly as claimed in claim 11, wherein the adjusting element is screwed in the high pressure chamber of the main body.

15. The high pressure source assembly as claimed in claim 14, wherein the adjusting element has a driving recess formed on an end thereof.

16. The high pressure source assembly as claimed in claim 11, wherein the sealing segment of the piston comprises
a socket formed on the first end of the piston; and
a sealing ball mounted in the socket.

17. The high pressure source assembly as claimed in claim 11, wherein the elastic element comprises multiple elastic washers.

18. The high pressure source assembly as claimed in claim 11, wherein the elastic element is a spring.

19. The high pressure source assembly as claimed in claim 11, wherein
a shoulder is formed in the regulated chamber;
a flange is formed around the piston; and
the elastic element is clamped between the shoulder and the flange to prepossess the piston to move toward the outlet of the main body.

20. The high pressure source assembly as claimed in claim 11, wherein the main body comprise a seat and a bonnet screwed on the seat.

* * * * *